United States Patent
De et al.

(10) Patent No.: US 8,484,744 B1
(45) Date of Patent: Jul. 9, 2013

(54) DETECTING IMPERSONATION ON A SOCIAL NETWORK

(75) Inventors: Arijit De, Dombivili (IN); Colin M. Bogart, San Francisco, CA (US); Caitlin S. Collins, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/464,061

(22) Filed: May 4, 2012

Related U.S. Application Data

(63) Continuation of application No. 12/495,099, filed on Jun. 30, 2009, now Pat. No. 8,225,413.

(51) Int. Cl.
*H04L 29/06* (2006.01)

(52) U.S. Cl.
USPC .......................................................... 726/26

(58) Field of Classification Search
None
See application file for complete search history.

(56) References Cited

U.S. PATENT DOCUMENTS

| | | | | |
|---|---|---|---|---|
| 8,060,570 B2 * | 11/2011 | Pousti et al. | ................... | 709/206 |
| 2008/0097999 A1 * | 4/2008 | Horan | ............................. | 707/10 |
| 2008/0235163 A1 * | 9/2008 | Balasubramanian et al. | .. | 706/12 |
| 2009/0019524 A1 * | 1/2009 | Fowler et al. | ..................... | 726/3 |
| 2009/0089876 A1 * | 4/2009 | Finamore et al. | ............... | 726/21 |
| 2009/0228780 A1 * | 9/2009 | McGeehan | .................... | 715/234 |
| 2009/0320101 A1 * | 12/2009 | Doyle et al. | ....................... | 726/4 |
| 2010/0095375 A1 * | 4/2010 | Krishnamurthy et al. | ....... | 726/22 |
| 2010/0115114 A1 * | 5/2010 | Headley | ......................... | 709/229 |
| 2010/0122347 A1 * | 5/2010 | Nadler | ............................. | 726/26 |
| 2010/0318925 A1 * | 12/2010 | Sethi et al. | ...................... | 715/760 |
| 2011/0191200 A1 * | 8/2011 | Bayer et al. | ................... | 705/26.1 |
| 2011/0320582 A1 * | 12/2011 | Lewis | ........................... | 709/224 |
| 2012/0123920 A1 * | 5/2012 | Fraser et al. | ..................... | 705/34 |
| 2012/0246089 A1 * | 9/2012 | Sikes | ............................ | 705/325 |

OTHER PUBLICATIONS

Brad Stone "Keeping a True Identity Becomes a Battle Online" The New York Times; Jun. 17, 2009. [online] Retrieved from the Internet Jun. 18, 2009 http://www.nytimes.com/2009/06/18/technology/internet/18name.html?_1 =1&hpw.

"Keeping Orkut Beautiful: Reporting impersonation" [online] Retrieved from Internet Jun. 9, 2009 http://www.google.com/support/orkut/bin/answer.py?answer=59678.

* cited by examiner

*Primary Examiner* — William Goodchild
(74) *Attorney, Agent, or Firm* — Fish & Richardson P.C.

(57) ABSTRACT

In one implementation, a method includes receiving a claim that identifies a first user profile page as allegedly impersonating a second user profile page on a social network, and retrieving first information associated with the first user profile page and second information associated with the second user profile page. The method can also include comparing the first information and the second information to identify indicators of impersonation. The method can further include, based upon the identified indicators of impersonation, determining that the first user profile page is likely impersonating the second user profile page on the social network, wherein first user profile page is determined to be likely impersonating the second user profile page when the first and second user profile pages are determined to be similar to each other; and returning a flag indicating that the first user profile page is likely impersonating the second user profile page.

21 Claims, 6 Drawing Sheets

DETECTING IMPERSONATION ON A SOCIAL NETWORK

CROSS-REFERENCE TO RELATED APPLICATIONS

This application is a continuation of and claims priority under 35 U.S.C. §120 to U.S. application Ser. No. 12/495,099, filed on Jun. 30, 2009, the entire contents of which are hereby incorporated by reference.

TECHNICAL FIELD

This document generally describes techniques, methods, systems, and mechanisms for identifying impersonation of a user profile page on a social network.

BACKGROUND

A social network can be an online system that provides a forum for geographically separated users to interact with one another. Social networks can be aimed at different types of social interaction, such as friendship and business networking. A user of a social network can have a profile page (e.g., a web page on the social network) that provides information about the user to other users of the social network. A profile can include information regarding a user's acquaintance relationships (e.g., friends, colleagues, schoolmates, etc.) on the social network.

A user can impersonate (e.g., assume the identity of another) another user on a social network by creating a profile page that contains content identifying the impersonated user (e.g., the victim of impersonation). For example, a first user can impersonate a second user on a social network by creating a profile page that contains identifying information about the second user, such as the second user's name, age, location, occupation, and photograph. An impersonating profile page may copy some or all of the impersonating content from the victim's profile page. Impersonation may be performed for a variety of reasons, such as malice toward the victim (e.g., impersonator has intent to defame the victim), and/or intent to usurp the victim's influence on a social network (e.g., impersonator able to garner the victim's reputation when recommending a product to the victim's friends).

Detecting impersonation on a social network has included manual review of an alleged impersonator's profile page and, in some cases, review of an alleged victim's profile page by a human.

SUMMARY

This document describes techniques, methods, systems, and mechanisms for detecting impersonation of a user's profile page on a social network. In general, impersonation can be detected by comparing elements (e.g., fields, photos, metadata, etc.) of a profile page of an alleged impersonator with elements of a profile page of an alleged victim. Such a comparison can yield signals indicating that the profile page of the alleged impersonator is likely impersonating the profile page of the alleged victim. Based upon detected signals indicating impersonation, a determination can be made as to a likelihood that the profile page of the alleged impersonator is impersonating the profile page of the alleged victim.

In one implementation, a computer-implemented method includes receiving at a server system a claim that identifies a first user profile page on a social network as allegedly impersonating a second user profile page on the social network, and retrieving by the server system first information associated with the first user profile page and second information associated with the second user profile page. The method can also include comparing by the server system the first information and the second information to identify indicators of impersonation, wherein comparing the first information and the second information to identify indicators of impersonation comprises identifying similarities of elements on the first user profile page and corresponding elements on the second user profile page. The method can further include, based upon the identified indicators of impersonation, determining that the first user profile page is likely impersonating the second user profile page on the social network, wherein first user profile page is determined to be likely impersonating the second user profile page when the first and second user profile pages are determined to be similar to each other; and returning by the server system a flag indicating that the first user profile page is likely impersonating the second user profile page.

In another implementation, a system for identifying impersonation of a user profile page on a social network includes one or more servers, and an interface to the one or more servers to receive a claim that identifies a first user profile page on a social network as allegedly impersonating a second user profile page on the social network and to return a flag indicating that the first user profile page is likely impersonating the second user profile page. The system can also include a user profile retrieving component to retrieve first information associated with the first user profile page and second information associated with the second user profile page, and a comparison module to compare the first information and the second information to identify indicators of impersonation, wherein comparing the first information and the second information to identify indicators of impersonation comprises identifying similarities of elements on the first user profile page and corresponding elements on the second user profile page. The system can further include an impersonation analysis component to determine that the first user profile page is likely impersonating the second user profile page on the social network based upon the identified indicators of impersonation.

In another implementation, a system for identifying impersonation of a user profile page on a social network includes one or more servers, and an interface to the one or more servers to receive a claim that identifies a first user profile page on a social network as allegedly impersonating a second user profile page on the social network and to return a flag indicating that the first user profile page is likely impersonating the second user profile page. The system can also include a user profile retrieving component to retrieve first information associated with the first user profile page and second information associated with the second user profile page, and means for comparing the first information and the second information to identify indicators of impersonation, wherein comparing the first information and the second information to identify indicators of impersonation comprises identifying similarities of elements on the first user profile page and corresponding elements on the second user profile page. The system can further include an impersonation analysis component to determine that the first user profile page is likely impersonating the second user profile page on the social network based upon the identified indicators of impersonation, wherein first user profile page is determined to be likely impersonating the second user profile page when the first and second user profile pages are determined to be similar to each other.

Particular embodiments can be implemented to realize one or more of the following advantages. For instance, greater efficiency can be gained with respect to detecting impersonation on a social network. Instead of manually detecting impersonation, a variety of automated techniques can be used to more quickly and more efficiently handle claims of impersonation. The automated techniques provide a scalable solution to a fluctuating volume of claims of impersonation that can be produced by a large user-base. Additionally, the automated techniques enable more complex and thorough comparisons that may not be efficiently performed manually.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
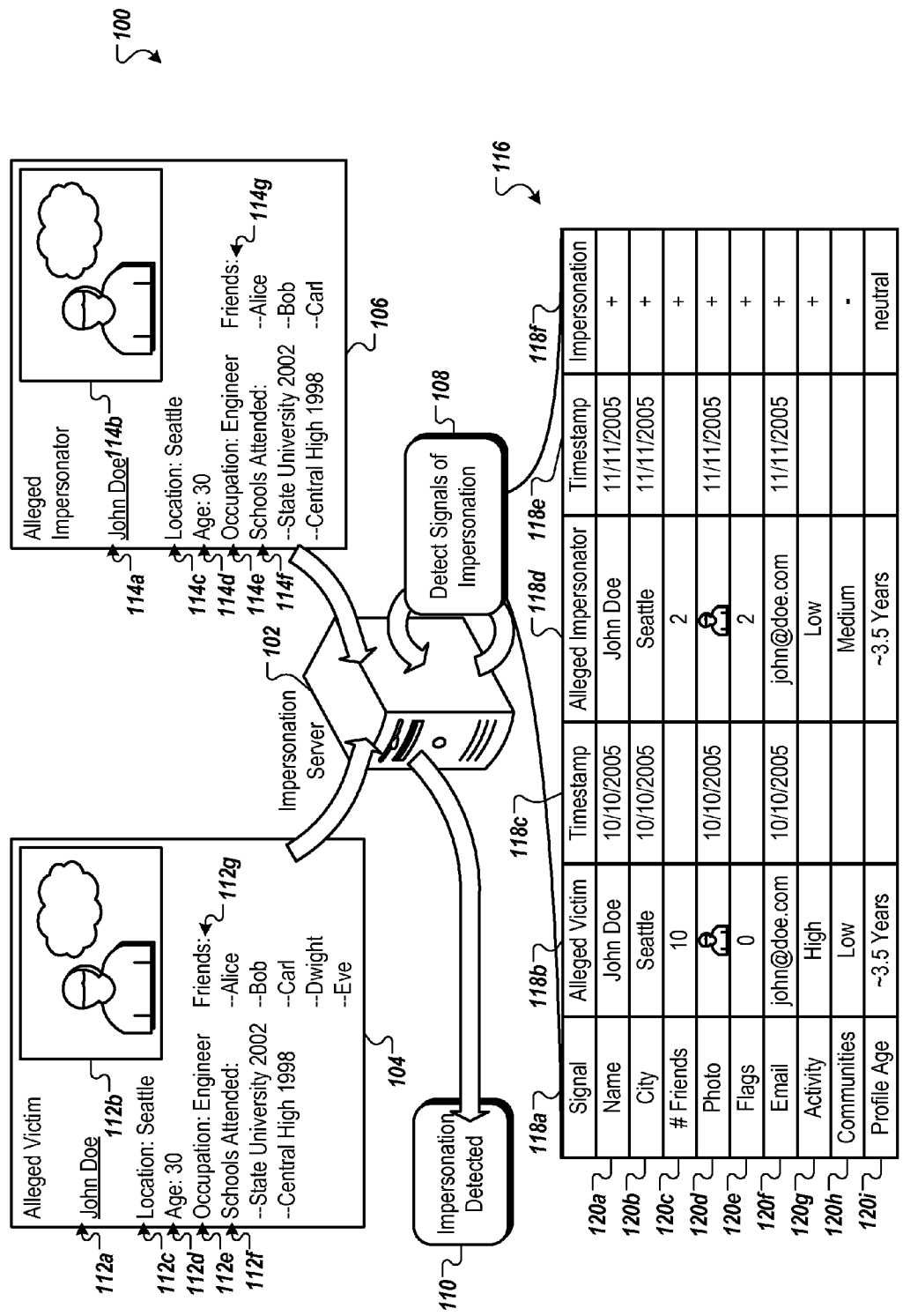
FIG. 1 is a conceptual diagram of an example system for detecting impersonation of a user profile page on a social network.

This document generally describes detecting impersonation on a social network. More specifically, the document describes methods, systems, and mechanisms for automating detection of user profile impersonation on a social network by analyzing and comparing a profile of an alleged impersonator (a user alleged to be impersonating the profile of another user of the social network) and/or a profile of an alleged victim (a user alleging impersonation).

A profile for a user on a social network can include a variety of details regarding the identity of the user. For instance, a user's profile can include identifying information such as the user's name, location (e.g., country, city, neighborhood, etc.), contact information (e.g., email address, phone number, etc.), occupation, employer, educational institutions attended, acquaintance relationships (e.g., friends, colleagues, family, etc.), interests (e.g., sports, music, outdoors, etc.), photographs and videos of the user, etc.

A user (an impersonator) can impersonate the identity of another user (a victim) on a social network by creating a profile that has some or all of the identifying details contained in the victim's profile. For instance, a first user may impersonate a second user on a social network by creating a new profile and populating fields (e.g., name, location, occupation, etc.) of new profile with copied text (e.g., name, location, occupation, etc.) and photographs from the second user's profile. Additionally, the second user may attempt to create acquaintance relationships (e.g., send friend requests) with the same users that the first user has acquaintance relationships with.

When two users have similar profiles, it can be difficult to determine whether impersonation is taking place and, if so, which user's profile is the impersonator and which user's profile is being impersonated.

To automate detection of impersonation between the profiles of two users (an alleged impersonator and an alleged victim), analysis and comparison of the two profiles can be performed. Analysis can include determining an extent to which the profile of the alleged impersonator contains indicators of impersonation. A variety of profile characteristics can serve as indicators of impersonation, such as little to no activity (e.g., interaction with other users of the social network, profile updates, etc.) since the profile was initially created, membership in certain groups (e.g., deleted groups, flagged groups, etc.) on the social network, content defaming the user purported to be associated with the profile, flagging of the profile by other users of the social network, the presence of pornographic content, etc.

For example, analysis of a first profile of the alleged impersonator that has had no activity (e.g., the user has not signed-on to the social network) since creation of the profile and that contains negative remarks (e.g., "I am stupid") regarding the associated user may indicate impersonation by the first profile. Conversely, analysis of a second profile of the alleged impersonator that has had regular and frequent activity (e.g., profile updates, friend additions, etc.) since creation and that contains no defamatory or pornographic content may indicate against impersonation by the second profile.

As described above, detecting impersonation can also include comparing a profile of an alleged impersonator and a profile of an alleged victim. The two profiles can be compared to identify indicators of impersonation as well as indicators that impersonation is not taking place. Impersonation can be indicated by a variety of similarities between the two profiles. For instance, impersonation can be indicated by the two profiles containing similar fields (e.g., name, location, occupation, age, etc.), similar photographs, similar community memberships, similar acquaintance relationships, etc. Impersonation by the alleged impersonator can additionally be indicated by similar content (e.g., fields, photographs, etc.) on the alleged impersonator's profile postdating the similar content on the profile for the alleged victim (e.g., the same name field was added to the alleged impersonator's profile after it was added to the profile page of the alleged victim). Postdating can indicate that the content possibly originated in the profile of the alleged victim and that it was copied by the alleged impersonator.

Some similarities between the profiles of the alleged impersonator and the alleged victim can more strongly indicate impersonation than other similarities. For instance, the two profiles sharing sensitive personal information, such as contact information (e.g., phone number, address, etc.), can more strongly indicate impersonation than the two profiles sharing interests (e.g., sports, music, etc.).

Impersonation not taking place between the two profiles can be indicated in a variety of ways, such as by dissimilarity between content of the two profiles (e.g., the two profiles have different names), similar content contained in the alleged impersonator's profile that predates the similar content on the profile of the alleged victim (e.g., the same name field was added to the alleged impersonator's profile before the profile of the alleged victim), the alleged impersonator having more acquaintance relationships than the alleged victim, the alleged impersonator having an acquaintance relationship with the alleged victim, etc. The strength of such indications against impersonation can vary. For example, a photograph on the alleged impersonator's profile that predates the same photograph on the alleged victim's profile can more strongly indicate impersonation is not taking place than the two profiles having different interests.

Impersonation can be detected by evaluating the indicators of impersonation and the indicators that impersonation is not taking place as determined from analyzing and comparing the profiles of the alleged impersonator and the alleged victim. Various models and thresholds can be used to determine, from these indicators, likelihood of impersonation (e.g., impersonation is certain, impersonation probable, not impersonation taking place, etc.). In various implementations, these indicators are quantified (e.g., 10 points for the two profiles having the same name, 2 points for the profiles having the same interest, etc.) and can be combined to form a match score for the two profiles. Such a match score can indicate a likelihood of impersonation.

Based upon the determined likelihood of impersonation, a variety of actions can be taken with regard to the profile of the alleged impersonator. For instance, the profile of the alleged impersonator can be deleted from the social network if impersonation is certain. In another example, the profile of the alleged impersonator can be flagged for human review if impersonation is probable (e.g., the alleged impersonator's profile has some similarities as well as some dissimilarities with respect to the profile of the alleged victim). In a further example, the profile of the alleged impersonator can remain on the social network without further review if impersonation is not likely.

FIG. 1 is a conceptual diagram of an example system 100 for detecting impersonation of a user profile page on a social network. FIG. 1 shows an impersonation server 102 that determines a likelihood that an alleged victim's profile page 104 is being impersonated by an alleged impersonator's profile page 106. Similar to the description above, the impersonation server 102 can detect impersonation by identifying signals (e.g., indicators) of impersonation 108 based on the alleged victim's profile page 104 and/or the alleged impersonator's profile page 106. From the identified signals of impersonation 108, the impersonation server 102 can provide an output 110 (e.g., a flag, a message, a display, etc.) regarding a likelihood of impersonation (e.g., impersonation is highly likely, impersonation is likely but not certain, impersonation is unlikely, etc.) between the profile pages 104 and 106.

The profile page 104 and the profile page 106 are example pages of a social network (e.g., FACEBOOK, ORKUT, MYSPACE, LINKEDIN, etc.) relating to the alleged victim (e.g., a user alleging impersonation of its profile page) and the alleged impersonator (e.g., the user alleged to be impersonating the victim's profile page 104), respectively. A social network can have a multitude of users. A user of a social network can have a profile page that contains content regarding the user, such as the user's name, location, interests, background, etc. At least some of the content contained in a profile page can identify a user to other users of the social network. For instance, members of a high school class can locate each other on a social network based on the members' profile pages containing information regarding their high school and year of graduation.

The profile pages 104 and 106 are presented for illustrative purposes and contain example content 112a-g and 114a-g, respectively. Depending on the social network, the content contained in a profile page can vary. For instance, a first user of a business oriented social network (e.g., LINKEDIN) a may list work history in its profile page, whereas a second user of a friendship oriented social network (e.g., MYSPACE) may list musical interests in its profile page The alleged victim's profile page 104 includes a name field 112a ("John Doe"), a photograph 112b, a location field 112c (Seattle), an age field 112d (30), an occupation field 112e (engineer), a list of schools attended 112f (State University, 2002; Central High, 1998), and a list of friends 112g (Alice, Bob, Carl, Dwight, and Eve) on the social network. The alleged impersonator's profile page 106 contains the same fields with virtually identical content: a name field 114a ("John Doe"), a photograph 114b, a location field 114c (Seattle), an age field 114d (30), an occupation field 114e (engineer), a list of schools attended 114f (State University, 2002; Central High, 1998), and a list of friends 114g (Alice, Bob, and Carl) on the social network.

Impersonation of a user's profile page can create confusion on a social network as to which profile page actually corresponds to the user that is depicted. For instance, a user of the social network trying to identify a profile page belonging to the "John Doe" will likely have difficulty determining which of the two profile pages 104 and 106 is authentic (e.g., not impersonating another user).

The impersonation server 102 receives the profile page 104 of the alleged victim and the profile page 106 of the alleged impersonator (or identifiers corresponding to the profile pages 104 and 106). The impersonation server 102 can receive the profile pages 104 and 106 from a variety of sources. For example, the impersonation server 102 may receive the profile pages 104 and 106 from a user alleging impersonation (e.g., the alleged victim entered the profile pages 104 and 106 into a user interface). In another example, the impersonation server 102 may receive the profile pages 104 and 106 from a routine running on the social network that identifies similar profile pages for review by the impersonation server 102.

Upon receiving the profile pages 104 and 106, the impersonation server 102 can begin to determine the likelihood that the profile page 106 is impersonating the profile page 104 of the alleged victim. As described above, the impersonations server 102 can make such a determination by detecting signals of impersonation 108 (e.g., detect indicators of impersonation). A signal of impersonation can indicate that, based upon the signal being detected, impersonation is more likely than not. For example, the profile page 106 of the alleged impersonator having content 114a-f that is identical to content 112a-f of the profile page 104 of the alleged victim can be signal of impersonation—it is more likely than not that the profile page 106 is impersonating the profile page 104 based upon these similarities.

Signals (indicators) of impersonation can be detected by comparing the profile page 104 of the alleged victim with the profile page 106 of the alleged impersonator. Signals of impersonation can also be detected by analyzing the profile page 104 of the alleged victim and/or the profile page 106 of the alleged impersonator. Strengths by which signals indicate impersonation can vary. For instance, two profile pages sharing the same name is likely a stronger indicator of impersonation than the two profile pages sharing the same interest.

Signals (indicators) contrary to impersonation can also be detected by the impersonation server 102. A signal contrary to impersonation can indicate that, based on the signal being detected, it is more likely than not that no impersonation is taking place. For example, were the alleged impersonator's profile page 104 to be older than (created on the social network before) the alleged victim's profile page 106, then a signal contrary to impersonation can be detected—it is more likely than not that no impersonation is taking place based on the alleged impersonator's profile page 104 predating the alleged victim's profile page.

Table 116 depicts some example signals (indicators) of impersonation and contrary to impersonation that can be detected by the impersonation server 102 from the profile pages 104 and 106. Column 118a contains the example signals 120a-j (indicators) that are detected by the impersonation server 102. Columns 118b and 118d contain content from the alleged victim's profile page 104 and the alleged impersonator's profile page 106, respectively, that are used to detect each of the signals 102a-j. Columns 118c and 118e list timestamps (e.g., a recorded time) associated with the content contained in columns 118b and 118d, respectively, which can be used by the impersonation server 102 to detect the signals 120a-j. Column 118f contains determinations made by the impersonation server 102 as to whether each of the signals 120a-j is an indicator of impersonation (denoted with a '+'), is an indicator contrary to impersonation (denoted with a '−'), or is neutral as to impersonation.

A variety of signals are depicted in the table 116. For signals 120a-b, 120c, and 120g, the impersonation server 102 compares a field from the profile 104 of the alleged victim with a field from the profile 106 of the alleged impersonator to detect similarities. Based on detected field similarities (or dissimilarities) from these comparisons, the impersonation server 102 determines whether impersonation is indicated. Similarity can be correlated with a likelihood of impersonation—a greater degree of similarity between the two profile pages can correspond to a higher likelihood of impersonation by the alleged impersonator.

As demonstrated by the '+' for the signal 120a, impersonation is indicated by the alleged impersonator having the same name field (112a and 114a) as the alleged victim. As demonstrated by the '+' for the signal 120b, impersonation is indicated by the alleged impersonator having the same location field (112c and 114c) as the alleged victim. As demonstrated by the '+' for the signal 120d, impersonation is indicated by the alleged impersonator having the same photo (112b and 114b) as the alleged victim. As demonstrated by the '+' for the signal 120g, impersonation is indicated by the alleged impersonator having the same associated email address as the alleged victim. As exemplified by comparison of the email address, fields that are associated with but not displayed on the profile pages 104 and 106 can be compared to identify impersonation.

For the signals 120a-b, 120c, and 120g, the impersonation server 102 may also consider timestamp information for the compared content. For instance, if similar content originated on (e.g., was added to) the alleged victim's profile page before it appeared on the alleged impersonator's profile page, then the impersonation server 102 may determine that impersonation is more likely than not. Conversely, if similar content originated on the alleged impersonator's profile page before appearing on the alleged victim's profile page, then the impersonation server 102 may determine that it is more likely than not that no impersonation is taking place (e.g., it is unlikely the alleged impersonator copied content that had not yet been added to the alleged victim's page). For the signals 120a-b, 120c, and 120g, the timestamp information from columns 118c and 118e indicates that name, location, photo, and email content originated on the profile 104 of the alleged victim (on Oct. 10, 2005) before appearing on the profile 106 of the alleged impersonator (on Nov. 11, 2005). The impersonation server 102 can use this timestamp information to determine that each of the signals 120a-b, 120c, and 120g indicates impersonation.

For the signal 120c, the impersonation server 102 can compare a number of friends 112g (or other acquaintance relationships on a social network) that the alleged victim has with a number of friends 114g for the alleged impersonator. The number of friends associated with the alleged impersonator's profile page 106 can be inversely correlated with a likelihood of impersonation—a smaller number of friends for the alleged impersonator's profile page 106 can indicate a greater likelihood of impersonation. In this example, impersonation is indicated by the alleged victim having more friends (e.g., the alleged victim is more active on and/or involved with the social network) than the alleged impersonator.

A variety of other aspects of acquaintance relationships (friends) can be examined to indicate impersonation, such as a number of overlapping acquaintance relationships (e.g., friends the alleged victim and the alleged impersonator have in common), comparing timestamps at which point each of the overlapping acquaintance relationship was established (e.g., did the alleged impersonator or the alleged victim add Alice as a friend first), interactions via acquaintance relationships (e.g., messages sent to a friend, view of a friend's profile page, etc.), etc.

For the signal 120f, the impersonation server 102 can compare a number of times that the profile page 104 has been flagged by other users of the social network in comparison to a number of times the profile page 106 has been flagged. A user's profile page can be flagged by other users for a variety of reasons, including another user believing the profile page is an imposter, the profile page displaying inappropriate/offensive content, etc. The number of times that the alleged impersonator's profile page 106 is flagged can correlate to a likelihood of impersonation—a greater number of flags for the alleged impersonator's profile page 106 can indicate a greater likelihood of impersonation by the alleged impersonator. In this example, impersonation is indicated by the profile page 106 of the alleged impersonator having been flagged (two times) more than the profile page 104 of the alleged victim (flagged zero times).

For the signal 102h, the impersonation server 102 can compare a level of activity on a social network for the alleged impersonator with a level of activity for the alleged victim. Activity on a social network can be gauged in a variety of ways, including through interaction with other users (e.g., messages sent to and/or received from other users, views of other users' pages, interaction with other users through online applications (e.g., games, messaging, etc.)), updates/additions to the content of a user's profile page, etc. Activity on a social network by the alleged impersonator can be inversely correlated to a likelihood of impersonation—a smaller degree of activity by the alleged impersonator can indicate a greater likelihood of impersonation. In this example, impersonation is indicated by the profile page 104 for the alleged victim having a greater level of activity (high) on the social network than the profile page 106 for the alleged impersonator (low activity).

For the signal 120i, the impersonation server 102 can compare community memberships for the alleged victim with community memberships for the alleged impersonator. Social networks can have communities to which users belong. Communities can be user created and can be centered on topics, themes, geographic location, educational institution affiliation, etc. A greater number of community memberships for the alleged impersonator can be inversely correlated to a likelihood of impersonation—a smaller number of community memberships for the alleged impersonator can indicate that impersonation by the alleged impersonator is more likely. In this example, an indicator contrary to impersonation is determined by the alleged impersonator having a greater amount of community memberships (medium) than the alleged victim (low community memberships).

For the signal 120*j*, the impersonation server 102 can compare the age of the profile 104 of the alleged victim with the age of the profile 106 of the alleged impersonator. For the alleged impersonator, length of existence on the social network can be correlated to likelihood of impersonation—the shorter the alleged impersonator's profile 106 has existed on the social network, the more likely it is to be impersonating the alleged victim's profile 104. In this example, no indicator of impersonation is provided for the signal 120*j* (the signal 120*j* is neutral) as the alleged victim's profile 104 and the alleged impersonator's profile 106 have roughly the same age (approximately 3.5 years) on the social network.

The signals 120*a-j* are described above for illustrative purposes. Additional signals and additional aspects of the signals 120*a-j* are detailed below.

The impersonation server 102 combines the indicators of impersonation (column 118*f*) for the detected signals 120*a-j* to determine the likelihood that the alleged impersonator's profile page 106 is impersonating the alleged victim's profile page 104. The indicators can be combined so as to take into account the strength by which each signal 120*a-j* provides an indication of or contrary to impersonation. The impersonation server 102 determines a likelihood of impersonation based upon the combined indicators and returns the output 110 indicating the determined likelihood. Given the similarities and the signals of impersonation between the alleged victim's profile 104 and the alleged impersonator's profile 106, in the depicted example the impersonation server 102 returns a high likelihood of impersonation as the output 110.

Figure 2:
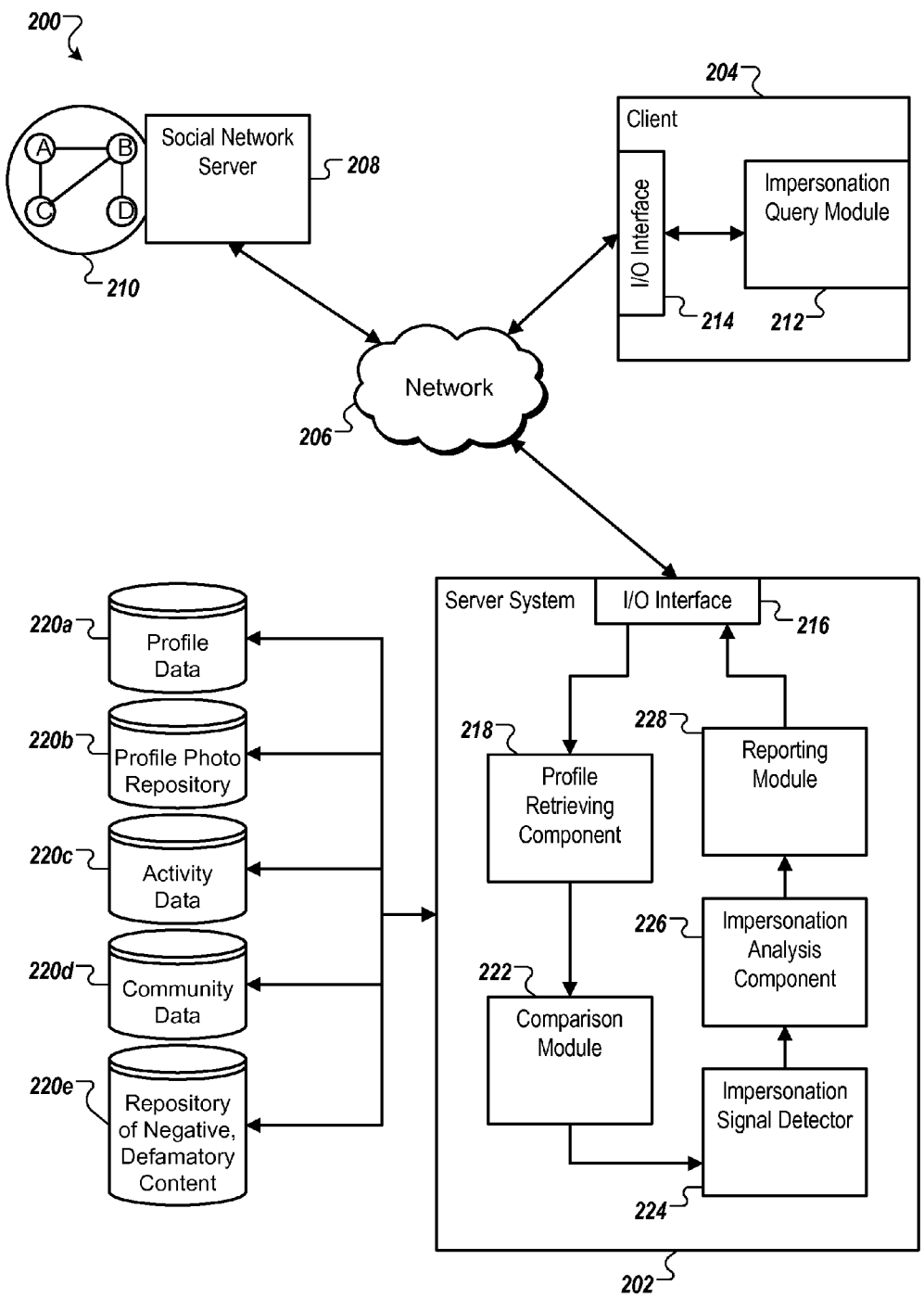
FIG. 2 is a diagram of another example system for detecting impersonation of a user profile page on a social network.

FIG. 2 is a diagram of another example system 200 for detecting impersonation of a user profile page on a social network. Similar to the system 100 described above with regard to FIG. 1, the system 200 depicts a server system 202 that is capable of detecting a likelihood of impersonation between user profiles (e.g., an alleged impersonator's profile page and an alleged victim's profile page) on a social network. The server system 202 can receive a claim of impersonation from a client computer 204 over a network 206. The server system 202 can also receive a claim of impersonation from a social network server 208 over the network. The social network server 208 can host a social network 210 of users. The depicted social network 210 is represented as a social graph of users and acquaintance relationships (e.g., friendship, business relationship, colleague, neighbor, etc.), where the users are nodes (e.g., A, B, etc.) and the acquaintance relationships are the vertices connecting the nodes.

The client computer 204 can be any sort of computing device capable of taking input from a user and communicating over the network 208 with the server system 202. For instance, the client computer 204 can be a desktop computer, a laptop, a cell phone, a PDA, a server, a embedded computing system, etc. The client computer 204 includes an impersonation claim module 212 that is capable of receiving input from a user and formulating a claim of impersonation to send to the server system 202 regarding impersonation by a user of the social network 210. A claim of impersonation can identify an alleged impersonator and an alleged victim. The impersonation claim module 212 transmits an impersonation claim from the client computer 204 to the server system 202 via an input/output (I/O) interface 214. The I/O interface 214 can be any type of interface capable of communicating with the server system 202 over the network 206, such as an Ethernet interface, a wireless networking interface, a fiber-optic networking interface, a modem, etc.

The network 206 can be any of a variety of networks over which the client computer 204, the server system 202, and the social network server 208 can communicate. For example, the network can be a local area network (LAN), a wide area network (WAN), the Internet, an intranet, a wireless network, a point-to-point network, etc. The network 208 transmits a claim of impersonation from the client computer 204 to the server system 202.

The server system 202 can be any of a variety of computing devices capable of detecting impersonation, such as a server, a distributed computing system, a desktop computer, a laptop, a cell phone, a rack-mounted server, etc. The server system 202 can receive an impersonation claim from the client computer 204 via the network 206 at an I/O interface 216 for the server system 202. The I/O interface 216 can be similar to the I/O interfaces 214 of the client computer 204. The I/O interface 216 provides the received impersonation claim to a profile retrieving component 218 of the server system 202. The profile retrieving component 218 can retrieve information regarding profiles specified in the received claim (e.g., the alleged victim's profile, the alleged impersonator's profile) from some or all data repositories 220*a-e*.

The data repositories 220*a-e* contain information displayed on and related to user profile pages. The profile data repository 220*a* contains data for fields of a profile page (e.g. name field, location field, etc.). The profile photo repository 220*b* contains photos and images that are displayed on or associated with a profile page (e.g., the photos 112*b* and 114*b* from FIG. 1). The activity data repository 220*c* contains information associated with a user's level of activity on a social network (e.g., messages sent to other users, friends and/or fans on the social network, data regarding frequency of profile updates and/or logins to the social network, etc.). The community data repository 220*c* contains data regarding community memberships for a user. The repository of negative and defamatory content 220*e* can include data associated with a user's profile page that has been flagged by other users and/or identified as being offensive (e.g., negative, pornographic, etc.) or defamatory—the presence of such content on a user's profile page may indicate the profile page is impersonating another user's profile page. The data repositories 220*a-e* can be accessed remotely by the server system 202 and may be populated with data from the social network server 208.

The profile information retrieved by the profile retrieving component 218 can be provided to the comparison module 222. The comparison module 222 can compare the profile information for the alleged impersonator and the alleged victim to identify similarities and dissimilarities. A variety of comparisons can be performed, such as text-based comparisons (e.g., edit distance) and image-based comparisons (e.g., image signature comparison). The comparison module 222 can identify a degree of similarity between elements (e.g., fields, photos, activity level, etc.) of the alleged impersonator's profile page and the alleged victim's profile page.

The comparison module 222 can provide results from comparing the alleged impersonator with the alleged victim to an impersonation signal detector 224. Similar to the discussion regarding the table 116 with regard to the impersonation server 102 depicted in FIG. 1, the impersonation signal detector 224 can identify signals of impersonation (as well as signals contrary to impersonation) based on the comparison results provided by the comparison module 222. A variety of signals (indicators) can be detected, including some or all of the signals 120*a-j* described above with regard to FIG. 1. Additional signals described below with regard to FIG. 3A can be detected as well.

The impersonation signal detector 224 can provide the detected signals (indicators) of impersonation to an impersonation analysis component 226, which can analyze the detected signals to determine a likelihood of impersonation by the alleged impersonator's profile page. Similar to the description above with regard to FIG. 1, the impersonation analysis component 226 can determine a likelihood of impersonation by combining the detected signals. In combining the detected signals, the impersonation analysis component 226 may weight the detected signals according to how strongly each detected signal indicates impersonation. For instance, assume a first signal (indicator) of impersonation regards the alleged impersonator having the same name and location as the alleged victim and a second signal of impersonation regards the alleged impersonator sharing an interest with the alleged victim. In such an example, the impersonation analysis component 226 may give the first signal a greater weight than the second signal when combining the detected signals of impersonation—the first signal more strongly indicates impersonation than the second signal.

The impersonation analysis component 226 can additionally determine a likelihood of impersonation based upon a variety of thresholds against which the combined signals (indicators) of impersonation are compared. For example, the impersonation analysis component 226 may use a first threshold and a second threshold for making determinations. The first threshold may designate a level of impersonation signals above which impersonation is highly likely and below which impersonation is likely, but not certain. The second threshold may be less than the first threshold and may designate a level of impersonation signals above which impersonation is likely, but not certain, and below which impersonation is unlikely. Threshold levels may vary and any number of thresholds may be used by the impersonation analysis component 226. Threshold variations can depend a variety of factors, such as a type of social network 210 (e.g., friendship, business networking, etc.) on which impersonation is being detected, a geographic area for the alleged victim and/or alleged impersonator, etc.

The impersonation analysis component 226 can provide a reporting module 228 with a determined likelihood of impersonation for the received impersonation claim (from the client computer 204 and/or the social network server 208). The reporting module 228 can respond to the party that submitted the impersonation claim with the results of the impersonation detection by the server system 202. The reporting module 228 can additionally contact the social network server 208 to delete or freeze the account of the alleged impersonator if the impersonation analysis component 226 has indicated a high likelihood of impersonation. The reporting module 228 may also place the impersonation claim in a queue of claims for manual review if there is impersonation is likely, but not certain. The reporting module 228 can interact with the social network server 208 and the client computer 204 via the I/O interface 216 and the network 206.

Figure 3A:
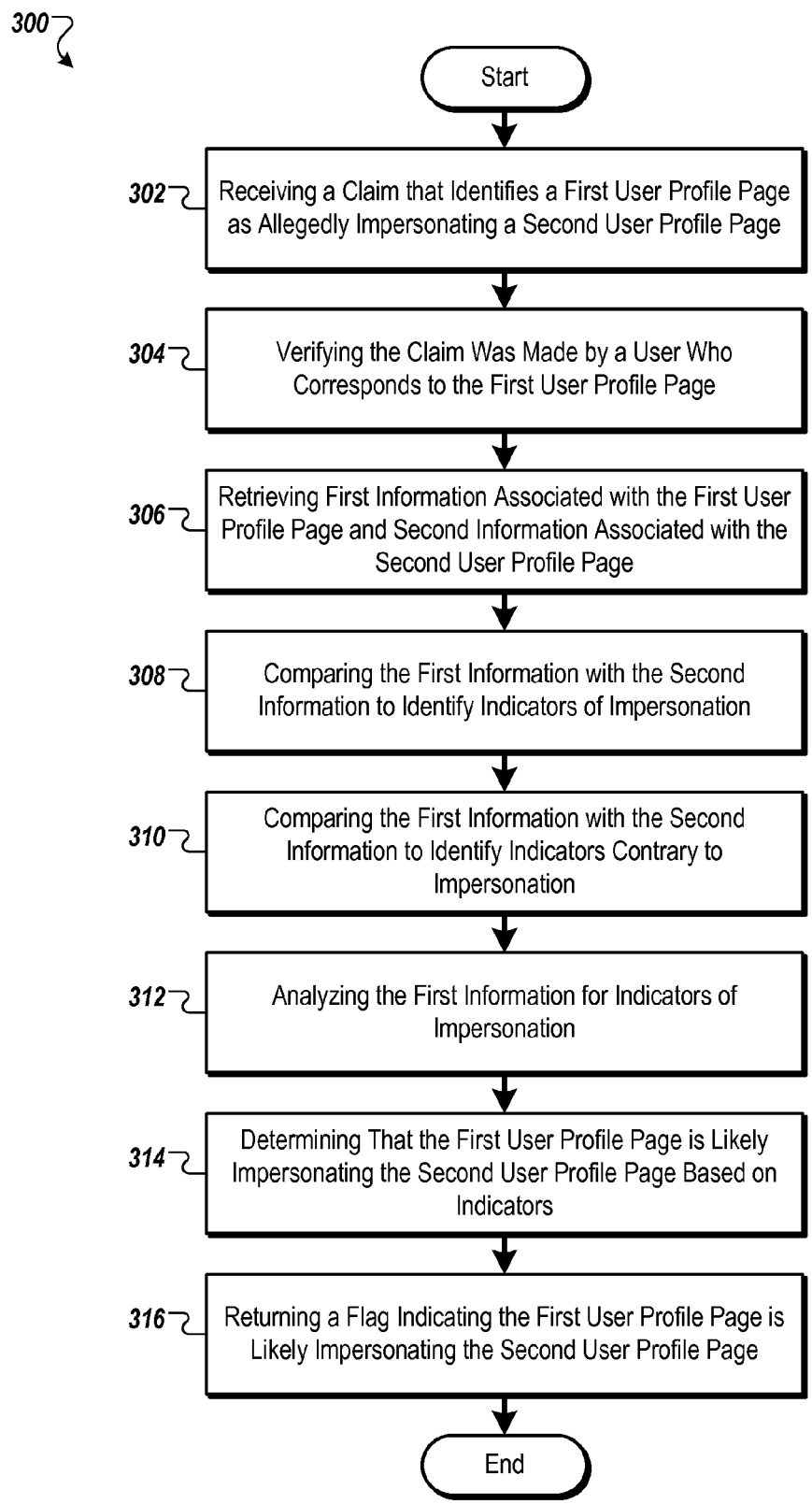
FIGS. 3A-B are flowcharts depicting example processes for detecting impersonation of a user profile page on a social network.
Figure 3B:
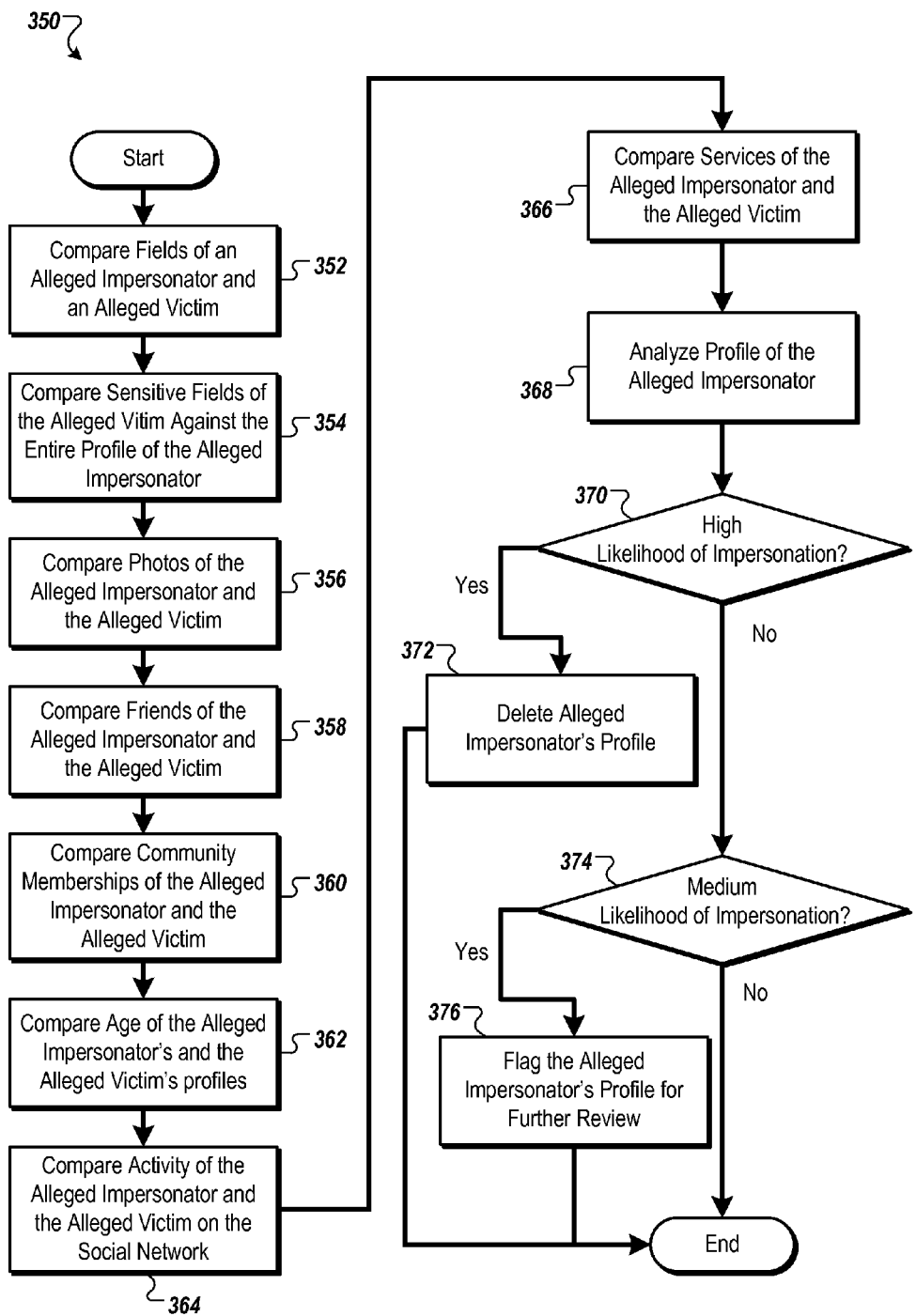

FIGS. 3A-B are flowcharts depicting example processes 300 and 350 for detecting impersonation of a user profile page on a social network. The processes 300 and 350 may be performed, for example, by a system such as the systems 100 and 200 and, for clarity of presentation, the description that follows uses the systems 100 and 200 as the basis of an example for describing the processes. However, another system, or combination of systems, may be used to perform the processes 300 and 350.

FIG. 3A is a flowchart depicting the example process 300 for detecting impersonation of a user profile page on a social network. The process 300 can be performed by any of a variety of servers and/or computing devices, such as the impersonation server 102 described above with regard to FIG. 1 and/or the server system 202 described above with regard to FIG. 2.

At step 302, a claim is received that identifies a first user profile page as allegedly impersonating a second user profile page. For example, the received claim can identify the profile page 106 of the alleged impersonator and the profile page 104 of the alleged victim, as described above with regard to FIG. 1. The claim can be received from any of a variety of sources, such as the client computer 204 and/or the social network server 208, described above with regard to FIG. 2.

The claim is verified as having been made by a user who corresponds to the first user profile page (step 304). For example, the server system 202 may verify with the social network server 208 that the user submitting the claim of impersonation is the same as the alleged victim, as described above with regard to FIG. 2. First information associated with the first user profile page and second information associated with the second user profile page is retrieved (step 306). For example, data regarding the profile page of the alleged impersonator and the profile page of the allege victim can be retrieved from the data repositories 220a-e by the profile retrieving component 218, as described above with regard to FIG. 2.

At step 308, the first information is compared with the second information to identify indicators of impersonation. The first information can also be compared with the second information to identify indicators contrary to impersonation (step 310). For instance, the comparison module 222 can compare data regarding profile pages of an alleged impersonator and an alleged victim and the impersonation signal detector 224 can identify signals (indicators) of impersonation and signal contrary to impersonation, as described above with regard to FIG. 2.

The first information can be analyzed for additional indicators of impersonation as well (step 312). As described above, the profile page of an alleged impersonator may contain indicators (signals) of impersonation that can be detected without comparison to the profile page of the alleged victim. For instance, an additional indicator of impersonation can include the profile page of the alleged impersonator containing content that is obscene, pornographic, illegal, defamatory, negative, offensive, etc. Additionally, several of the indicators of impersonation 120a-j described above with regard to FIG. 1 can be generated by examining the profile page of the alleged impersonator alone. For example, the indicators of (and/or contrary to) impersonation 120f, 120h, and 120j can be generated based upon the information associated with the profile 106 of the alleged impersonator (e.g., impersonation can be indicated for the signal 120f by the alleged impersonator having been flagged twice).

At step 314, the first user profile page is determined to likely be impersonating the second user profile page based on the detected indicators. For example, the impersonation analysis component 226 determines a likelihood of impersonation based upon the detected indicators of impersonation, as described above with regard to FIG. 2. A flag indicating that the first user profile page is likely impersonating the second user profile page is returned (step 316). For instance, the reporting module 228 can return a flag to the client computer 204 and/or to the social network server 208 indicating that a likelihood of impersonation for the received impersonation claim, as described above with regard to FIG. 2.

FIG. 3B is a flowchart depicting the example process 350 for detecting impersonation of a user profile page on a social network. More specifically, the example process 350 regards identifying indicators of impersonation and, based upon the identified indicators, determining a likelihood of impersonation. The process 350 can be performed by any of a variety of servers and/or computing devices, such as the impersonation server 102 described above with regard to FIG. 1 and/or the server system 202 described above with regard to FIG. 2.

At step 352, the fields of a profile page of an alleged impersonator are compared against the fields of a profile page of an alleged victim to identify indicators of impersonation and/or indicators contrary to impersonation. Such a comparison can involve a per-field comparison of the two profile pages (e.g., the name field 112a of the alleged victim's profile page 104 is compared with the name field 114a of the alleged victim's profile page 106, the location field 112c is compared against the location field 114c, etc.). The comparison can include comparing current and previous values for each field. For example, assume the alleged victim's employer field was changed from "Acme" to "XY Corp." and that the alleged impersonator's employer field is "Acme." The current value ("XY Corp.") of the alleged victim's employer field as well as the previous value ("Acme") can be compared against the current value (as well as any previous values) of the alleged impersonator's employer field. Similarity between fields of the alleged victim and the alleged impersonator can be indicators of impersonation.

Step 352 can involve comparing some or all of the fields of the alleged victim's profile page and the alleged impersonator's profile page. Fields that can be compared depend on the fields available on the social network (e.g., friendship network, business networking site, etc.) of the alleged victim and impersonator. For example, fields that can be compared may include name, geographic location, occupation, employer, education institutions attended, contact information (e.g., email, phone, physical address, etc.), images, videos, songs, work history, skills, interests, certifications, etc.

As demonstrated above with regard to the chart 116 depicted in FIG. 1, field comparisons can take into account the timing by which similar content was added to a field of the alleged impersonator's profile and to a field of the alleged victim's profile. If similar content was added to an alleged impersonator's profile after it was added to an alleged victim's profile page, the timing can indicate impersonation. Conversely, if similar content was added to an alleged impersonator's profile before it was added to an alleged victim's profile page, the timing can be an indicator contrary to impersonation. For instance, if the alleged impersonator updated its employer field to recite "Acme" before the alleged victim did so, then impersonation is not indicated by this comparison (the alleged impersonator could not copy the alleged victim's field)—such a comparison can identify an indicator contrary to impersonation.

Indicators of impersonation (and indicators contrary to impersonation) can be weighted according to how strongly they each indicate impersonation. Strength of impersonation can be based on the similarity of the fields (e.g., fields that are more similar (e.g., identical) can more strongly indicate impersonation than fields that are less similar), the type of field (e.g., identifying field (name, contact information), interest field, etc.), and/or the timing of the two fields (see previous paragraph). For instance, a name field identically matching can more strongly indicate impersonation than an interest field.

In addition to the other mentioned factors, strength of impersonation may also be based upon how common the similar/matching value is for a field on the social network, within a sub-graph (a collection of users that is connected by acquaintance relationships and reasonably separate from other, unconnected users) on the social network, and/or within a geographic region (e.g., North America, Europe, etc.). For example, if the name "Bob" is more common on a social network than then name "Roberto," then a match for the name "Roberto" may more strongly indicate impersonation than a match for the name "Bob."

At step 354, sensitive fields of the alleged victim can be compared against the entire profile of the alleged impersonator (e.g., cross-field comparison can be performed) to identify indicators of impersonation and/or indicators contrary to impersonation. Sensitive fields can include fields that identify a user and/or provide contact information outside of the social network for a user, such as a name field, a phone number field, an email field, etc. For instance, if an alleged victim's name and email address are located in an "about me" field of the alleged impersonator's profile page, then a match for the name and email fields of the alleged victim is found. Although subject to the same strength of impersonation factors (e.g., degree of similarity, timing, commonality on the social network, field type, etc.) discussed above, a match of sensitive information can generally indicate impersonation more strongly than other non-sensitive information.

At step 356, photos and/or images contained on the profile page of the alleged victim and the profile page of the alleged impersonator are compared to identify indicators of impersonation and/or indicators contrary to impersonation. As described above with regard to FIGS. 1 and 2, photos and/or images can be compared using a variety of techniques, including comparing photo/image signatures, performing a visual photo/image comparison, comparing photo/image metadata (e.g., time of creation, identity of author, etc.), performing facial recognition on the alleged impersonator's photos/images using an photo of the alleged victim's face to identify non-matching images that pertaining to the alleged victim, etc. Some or all of the photos and/or images contained on an alleged victim's page can be compared against the photos and/or images contained on the alleged impersonator's profile page. Although subject to the same strength of impersonation factors (e.g., degree of similarity, timing, commonality on the social network, field type, etc.) discussed above, a match of a photo and/or an image can indicate impersonation more strongly than some field matches, such as non-sensitive fields.

For instance, a photo on the alleged victim's profile page that was added before and matches a photo on the alleged impersonator's profile page may strongly indicate impersonation. Conversely, a photo on the alleged victim's profile page that was added after and matches a photo on the alleged impersonator's profile page may provide a strong indication contrary to impersonation.

Friends of the alleged impersonator and friends of the alleged victim can be compared to identify indicators of impersonation and/or indicators contrary to impersonation (step 358). Various aspects of the friends of the alleged impersonator and the alleged victim can be compared to identify indicators of impersonation and/or indicators contrary to impersonation. For instance, if the alleged impersonator has more friends than the alleged victim, an indicator contrary to impersonation can be identified. In another example, if the alleged impersonator and the alleged victim are friends, a strong indicator against impersonation can be identified. In a further example, if a large number of friends of the alleged victim have flagged the profile of the alleged impersonator (e.g., identified the alleged impersonator's profile as being fake), a strong indicator of impersonation can be identified.

Depending on a variety of factors (e.g., a type of social network, how friendship relationships are used by the alleged impersonator and the alleged victim, timing of when friendship relationships of a common friend were established, etc.), an analysis of whether the matching sets of friends can either be an indicator of impersonation or an indicator contrary to impersonation. For instance, an alleged impersonator adding (or attempting to add—sending friend requests) a group of the alleged victim's friends after they were added by the alleged victim may be an indicator of impersonation.

At step 360, community memberships of the alleged impersonator and of the alleged victim can be compared to identify indicators of impersonation and/or indicators contrary to impersonation. A variety of indicators of impersonation can be identified based upon community memberships of the alleged impersonator and the alleged victim. For example, if the alleged impersonator is a member of a community that has been deleted and/or a member of community that has been flagged (for having content that is inappropriate, pornographic, obscene, etc.) a large number of times in relation to the community having a small number of members (as compared with other communities on the social network), then an indicator of impersonation can be identified. In another example, if the alleged impersonator and the alleged victim share a threshold amount (as a percentage or a raw number) communities, then an indicator of impersonation can be identified. In a further example, if the alleged impersonator is the creator (e.g., owner) of one or more communities that have a moderate number of members (in relation to other communities on the social network) and that have not been flagged, then an indicator contrary to impersonation can be identified.

An age of the alleged impersonator's profile page can be compared with an age of the alleged victim's profile page to identify indicators of impersonation and/or indicators contrary to impersonation (step 362). An indictor of impersonation can be identified for the alleged victim's profile is older than the alleged impersonator's page. The strength of the indication of impersonation can be based on the relative difference in age between the two profile pages. For instance, a stronger indication of impersonation can be identified if the alleged victim's profile page was created five years ago and the alleged impersonator's profile page was created a week ago than if the alleged victim's profile page was created two years ago and the alleged impersonator's profile page was create a year and a half ago. Conversely, an indicator contrary to impersonation can be identified if the alleged victim's profile page is younger (created after) the alleged impersonator's profile page.

At step 364, activity on the social network for the alleged impersonator's profile can be compared against activity related to the alleged victim's profile to identify indicators of impersonation and/or indicators contrary to impersonation. Activity on a social network associated with a user's profile can be gauged from a variety of sources, such as a number of messages sent and/or received on the social network, a number of fans on the social network, a number of flags from other users, a number of friends on the social network, frequency of profile updates and page views, etc. If the alleged victim is determined to have a greater level of activity than the alleged impersonator, then an indicator of impersonation can be identified. The strength of such an indicator can depend on the disparity in activity between the alleged victim and the alleged impersonator—a greater disparity can provide a stronger indication of impersonation while a small disparity can provide little, if any, indication of impersonation. Conversely, if the alleged victim is determined to have a lower level of activity than the alleged impersonator, then an indicator contrary to impersonation can be identified.

Additionally, activity trends can be taken into account when making such determinations. Consistent activity on the social network by the alleged victim juxtaposed against sporadic, heavy levels of activity by the alleged impersonator can provide an indication of impersonation. For example, if the alleged victim sends between ten and twenty messages a week while the alleged impersonator sends one hundred messages in a single day and then no messages for months, then an indicator of impersonation can be identified.

Services provided on the social network (e.g., online games, applications permitting online collaboration with other users, email, blogging, etc.) that are associated with the alleged impersonator and the alleged victim can be compared to identify indicators of impersonation and/or indicators contrary to impersonation (step 366). If the alleged victim is associated with more services than the alleged impersonator, then an indicator of impersonation can be identified. Similar to other indicators discussed above, a strength of such an indicator can depend on a disparity between the services associated with the alleged victim and the alleged impersonator—the greater the disparity, the greater the more strongly impersonation is indicated. Conversely, if the alleged impersonator is associated with more services than the alleged victim, then an indicator contrary to impersonation can be identified.

At step 368, the profile of the alleged impersonator is analyzed to identify indicators of impersonation and/or indicators contrary to impersonation. Indicators of impersonation can be identified with regard to the profile page of the alleged impersonator without consideration of the profile page of the alleged victim, as described above with regard to FIGS. 1 and 2. A variety of indicators of impersonation can be detected from the profile page of the alleged impersonator, including some indicators discussed above with regard to steps 352-366. For instance, fields of the alleged impersonator's profile page containing content that defames the purported user associated with the page can indicate impersonation. In another example, fields, photos, and/or images that contain obscene, offensive, pornographic, and/or illegal content can indicate impersonation as well.

Some or all of the indicators of impersonation (and/or the indicators contrary to impersonation) identified in steps 352-368 can be combined to determine whether there is a high likelihood that the alleged impersonator is impersonating the alleged victim (step 370). The indicators can be combined in a variety of manners, as described above with reference to FIGS. 1 and 2. As described above with regard to the impersonation analysis component 226 and the reporting module 228 of the server system 202, a threshold can be used to determine whether the combined indicators of impersonation correspond to a high likelihood of impersonation.

If a high likelihood of impersonation is determined, then the profile of the alleged impersonator can be deleted from the social network (step 372). If a high likelihood of impersonation is not determined, then a determination can be made as to a medium likelihood of impersonation (e.g., impersonation is likely, but not certain enough to warrant automatic deletion of the alleged impersonator) (step 374). The determination can be made similar to the determination made at step 370 but with a lower threshold. If a medium likelihood of impersonation is detected, then the profile of the alleged impersonator can be flagged for further review (e.g., manual review by a human). If a medium likelihood of impersonation is not determined (e.g., there is a low likelihood of impersonation), then the process 350 can end. In some implementations, if a low likelihood of impersonation is determined, the alleged victim can be asked to send in photo identification (e.g., a passport, a driver's license, etc.) to further substantiate the claim of impersonation.

In various implementations, scoring method can be used to determine a likelihood of impersonation. In such scoring methods, each indicator of impersonation and indicator contrary to impersonation can be assigned a score that corresponds to how strongly impersonation is indicated (or not indicated) by the detected signal of impersonation. For example, a strong indicator of impersonation (e.g., matching name fields between the alleged impersonator and the alleged victim) may receive a score that is two times, five times, ten times, twenty times, fifty times, etc. greater than a weak indicator of impersonation (e.g., matching interest fields between the alleged impersonator and the alleged victim). Scores assigned to indicators can vary among social networks (e.g., a friendship network, a business networking site, etc.), geographic locations, sub-graphs of a social network, etc.

In some implementations, indicators of impersonation can receive positive scores and indicators contrary to impersonation can receive negative scores. In such implementations, the scores for indicators can be aggregated into a match score for the alleged impersonator and the alleged victim (e.g., indicators of impersonation increase the match score and indicators contrary to impersonation decrease the match score). Determining a degree of likelihood of impersonation (e.g., a high likelihood, a medium likelihood, etc.) can involve comparing the score to various thresholds. For example, if the match score exceeds a threshold corresponding to a high likelihood of impersonation, then the alleged impersonator can be determined to have a high likelihood of impersonation. Similar to scores, threshold levels can vary among social networks (e.g., a friendship network, a business networking site, etc.), geographic locations, sub-graphs of a social network, etc.

Scoring thresholds can be determined in a variety of ways, such as by analyzing match scores produced for known cases of impersonation (e.g., alleged impersonator is impersonating the alleged victim) and/or known cases without impersonation (e.g., alleged impersonator is not impersonating the alleged victim). For example, thresholds can be generated through an automated analysis on a large sample of manually resolved claims of impersonation. Such an automated analysis can produce a histogram depicting the frequency of scores for both "impersonation" and "not impersonation" cases. Various thresholds can be determined from the histogram and the frequencies it depicts.

Various scores for indicators of impersonation and/or indicators contrary to impersonation can be capped at a maximum (or minimum) value. For instance, by using capping, a strong indicator of impersonation may not single-handedly boost the match score above any of the various thresholds that correspond to a likelihood of impersonation. Additionally, categories of scores for indicators of impersonation can additionally be capped. For instance, a maximum score may be contributed from matching photos.

Figure 4:
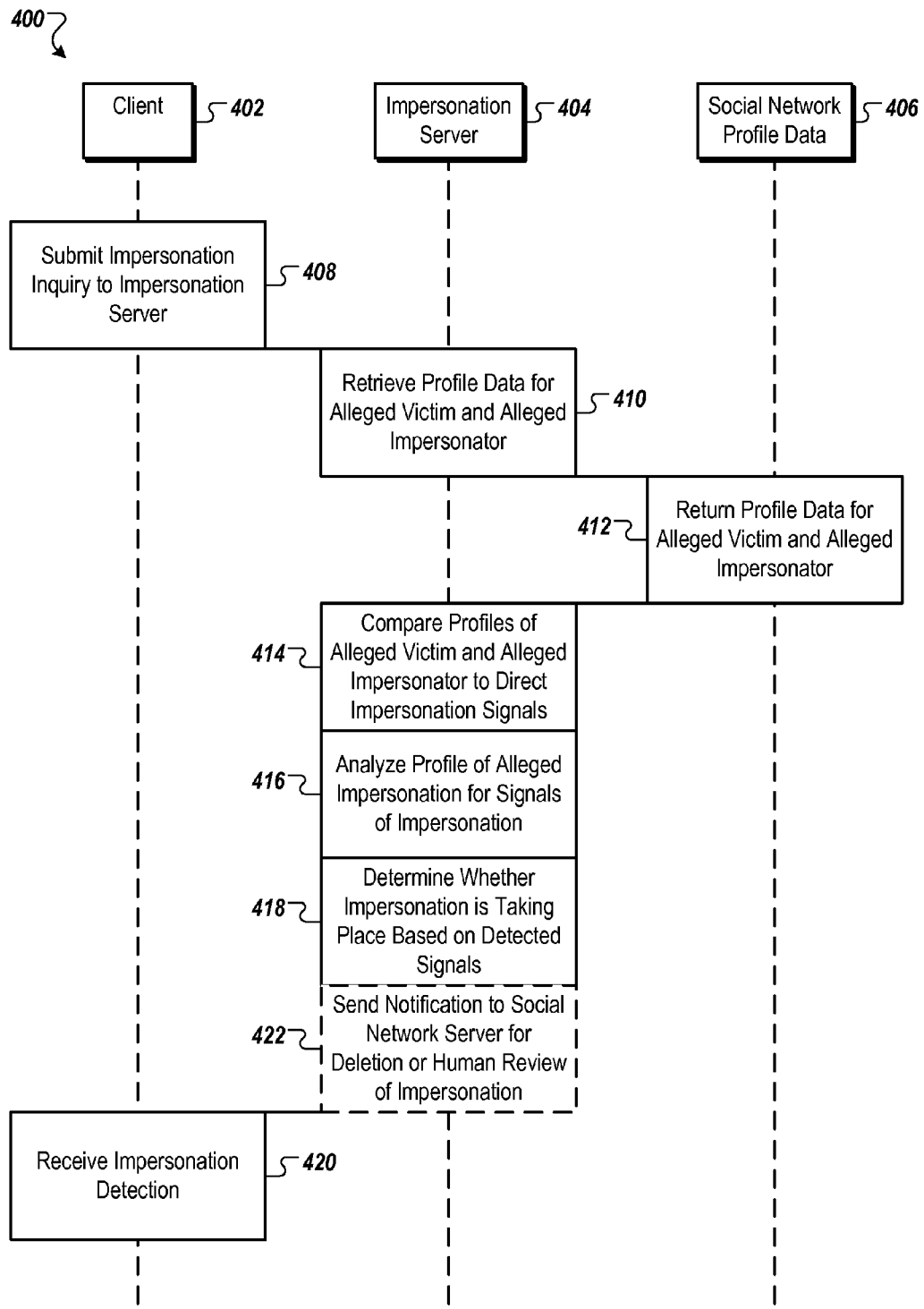
FIG. 4 is a timeline of an example process for detecting impersonation of a user profile page on a social network.

FIG. 4 is a timeline 400 of an example process for detecting impersonation of a user profile page on a social network. The example process can be performed by a client computer 402, an impersonation server system 404, and a repository of social network profile data 406, which may be similar to and/or correspond to the client computer 204, the impersonation server systems 102 and 202, and the data repositories 220a-e, respectively. Similarly, the example process depicted on the timeline 400 may be similar to the processes 300 and/or 350, described above with respect to FIGS. 3A-B.

At time 408, the client computer 408 submits an impersonation claim to the impersonation server 404. The submitted claim of impersonation can include the identity of an alleged impersonator and the identity of an alleged victim. At time 410, the impersonation server retrieves profile data for the alleged victim and the alleged impersonator from the repository of social network profile data 406. At time 412, the repository of social network repository data returns profile data for the alleged victim and the alleged impersonator to the impersonation server 404.

At time 414, the impersonation server 404 compares the retrieved profile data for the alleged victim with the profile data for the alleged impersonator to detect signals (indicators) of impersonation. In various implementations, the impersonation server 404 can score the detected signals of impersonation, as described above with regard to FIG. 3B. At time 416, the impersonation server 404 analyzes the profile of the alleged impersonator for signals of impersonation, similar to the analysis described with regard to step 368.

At time 418, the impersonation server 404 determines a likelihood that impersonation is taking place (e.g., a likelihood that the alleged impersonator is impersonating the alleged victim) based on the detected signals. In various implementations, the impersonation server 404 may make such a determination by comparing a match score to various thresholds corresponding to various likelihoods of impersonation. At time 420, the client computer 402 receives notification from the impersonation server 404 regarding a likelihood of impersonation. In some implementations, at time 422 the impersonation server 404 sends a notification to a social network server (not depicted) regarding deletion of the alleged impersonator's profile page and/or indicating the manual review of the alleged impersonator's profile page should be conducted.

Figure 5:
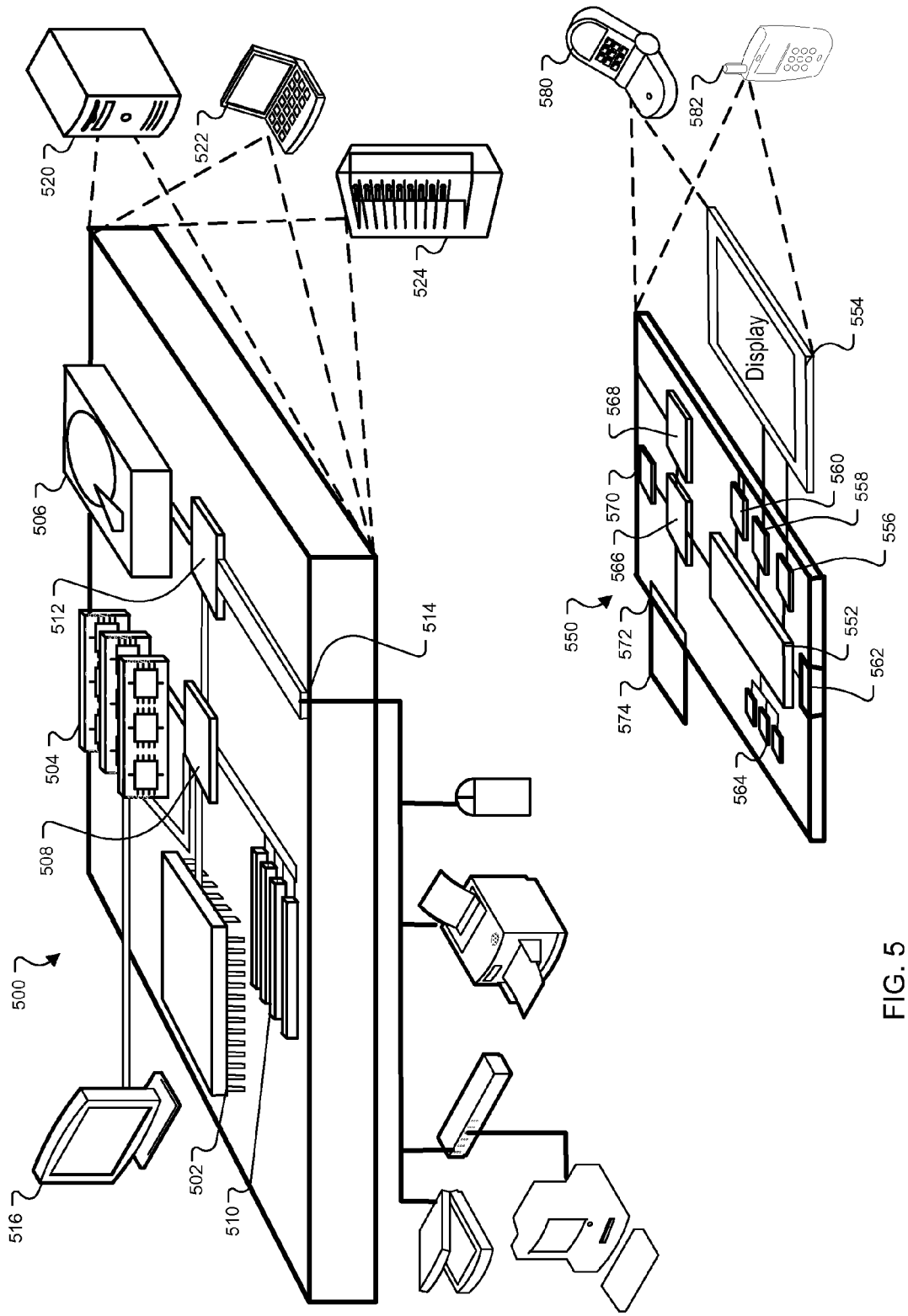
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, using one or more computing devices, an indication that identifies a first user profile as allegedly impersonating a second user profile;
   retrieving, using the one or more computing devices, first profile information associated with the first user profile and second profile information associated the second user profile;
   determining, using the one or more computing devices, similarities of elements in the first user profile information and corresponding elements in the second user profile information;
   based at least in part on the determined similarities of elements in the first user profile information and corresponding elements in the second user profile information, determining whether the first user profile is likely impersonating the second user profile; and
   when it is determined that the first user profile is likely impersonating the second user profile, returning, using the one or more computing devices, a flag indicating that the first user profile is likely impersonating the second user profile.

2. The computer-implemented method of claim 1, further comprising:
   identifying one or more first times at which the elements in the first user profile information were added to the first user profile, and one or more second times at which the corresponding elements in the second profile information were added to the second user profile;
   comparing the one or more first times with the one or more second times; and
   wherein the determination of whether the first user profile is likely impersonating the second user profile is further based, at least in part, on the comparison of the one or more first times with the one or more second times.

3. The computer-implemented method of claim 2, wherein impersonation of the second user profile by the first user profile is indicated by i) at least a portion of the elements in the first user profile information being determined to have at least a threshold level of similarity to at least a portion of the corresponding elements in the second user profile information, and ii) the at least a portion of the elements in the first user profile information having been added to the first user profile after the at least a portion of the corresponding elements in the second user profile information were added to the second user profile.

4. The computer-implemented method of claim 2, wherein no impersonation of the second user profile by the first user profile is indicated by i) at least a portion of the elements in the first user profile information being determined to have at least a threshold level of similarity to at least a portion of the corresponding elements in the second user profile information, and ii) the at least a portion of the elements in the first user profile information having been added to the first user profile before the at least a portion of the corresponding elements in the second user profile information were added to the second user profile.

5. The computer-implemented method of claim 1, further comprising:
determining whether the first user profile information includes particular content that i) mentions a user that is purported to be associated with the first user profile or the second user profile in a negative manner, or ii) is of one or more predetermined types of bad content; and
wherein the determination of whether the first user profile is likely impersonating the second user profile is further based, at least in part, on the determination of whether the first user profile information includes the particular content.

6. The computer-implemented method of claim 5, wherein the one or more predetermined types of bad content are selected from the group consisting of: obscene content, offensive content, pornographic content, and illegal content.

7. The computer-implemented method of claim 1, wherein the elements in the first user profile information are selected from the group consisting of: fields of the first user profile, sensitive fields of the first user profile, photos, identities of other users who are designated as friends, group memberships, a user age or birthdate, social network activity of a user associated with the first user profile, and services associated with the first user profile.

8. A system comprising:
one or more computing devices;
an interface of the one or more computing devices programmed to receive an indication that identifies a first user profile as allegedly impersonating a second user profile;
a user profile retrieving component programmed to retrieve first profile information associated with the first user profile and second profile information associated the second user profile;
an impersonation signal detector programmed to determine similarities of elements in the first user profile information and corresponding elements in the second user profile information;
an impersonation analysis component programmed to determine whether the first user profile is likely impersonating the second user profile based at least in part on the similarities of elements in the first user profile information and corresponding elements in the second user profile information determined by the impersonation signal detector; and
a reporting module programmed to return a flag indicating that the first user profile is likely impersonating the second user profile when the impersonation analysis component has determined that the first user profile is likely impersonating the second user profile.

9. The system of claim 8, further comprising:
a comparison module programmed to compare one or more first times at which the elements in the first user profile information were added to the first user profile, with one or more second times at which the corresponding elements in the second profile information were added to the second user profile; and
wherein the impersonation analysis component is further programmed to determine whether the first user profile is likely impersonating the second user profile further based, at least in part, on the comparison of the one or more first times with the one or more second times.

10. The system of claim 9, wherein impersonation of the second user profile by the first user profile is indicated by i) at least a portion of the elements in the first user profile information being determined to have at least a threshold level of similarity to at least a portion of the corresponding elements in the second user profile information, and ii) the at least a portion of the elements in the first user profile information having been added to the first user profile after the at least a portion of the corresponding elements in the second user profile information were added to the second user profile.

11. The system of claim 9, wherein no impersonation of the second user profile by the first user profile is indicated by i) at least a portion of the elements in the first user profile information being determined to have at least a threshold level of similarity to at least a portion of the corresponding elements in the second user profile information, and ii) the at least a portion of the elements in the first user profile information having been added to the first user profile before the at least a portion of the corresponding elements in the second user profile information were added to the second user profile.

12. The system of claim 8, wherein the impersonation analysis component is further programmed to determine whether the first user profile is likely impersonating the second user profile further based, at least in part, on whether the first user profile information includes particular content that i) mentions a user that is purported to be associated with the first user profile or the second user profile in a negative manner, or ii) is of one or more predetermined types of bad content.

13. The system of claim 12, wherein the one or more predetermined types of bad content are selected from the group consisting of: obscene content, offensive content, pornographic content, and illegal content.

14. The system of claim 8, wherein the elements in the first user profile information are selected from the group consisting of: fields of the first user profile, sensitive fields of the first user profile, photos, identities of other users who are designated as friends, group memberships, a user age or birthdate, social network activity of a user associated with the first user profile, and services associated with the first user profile.

15. A computer program product embodied in a computer-readable storage device storing instructions that, when executed, cause one or more processors to perform operations comprising:
receiving an indication that identifies a first user profile as allegedly impersonating a second user profile;
retrieving first profile information associated with the first user profile and second profile information associated the second user profile;
determining similarities of elements in the first user profile information and corresponding elements in the second user profile information;
based at least in part on the determined similarities of elements in the first user profile information and corresponding elements in the second user profile information, determining whether the first user profile is likely impersonating the second user profile; and
when it is determined that the first user profile is likely impersonating the second user profile, returning a flag indicating that the first user profile is likely impersonating the second user profile.

16. The computer program product of claim 15, wherein the operations further comprise:
    identifying one or more first times at which the elements in the first user profile information were added to the first user profile, and one or more second times at which the corresponding elements in the second profile information were added to the second user profile;
    comparing the one or more first times with the one or more second times; and
    wherein the determination of whether the first user profile is likely impersonating the second user profile is further based, at least in part, on the comparison of the one or more first times with the one or more second times.

17. The computer program product of claim 16, wherein impersonation of the second user profile by the first user profile is indicated by i) at least a portion of the elements in the first user profile information being determined to have at least a threshold level of similarity to at least a portion of the corresponding elements in the second user profile information, and ii) the at least a portion of the elements in the first user profile information having been added to the first user profile after the at least a portion of the corresponding elements in the second user profile information were added to the second user profile.

18. The computer program product of claim 16, wherein no impersonation of the second user profile by the first user profile is indicated by i) at least a portion of the elements in the first user profile information being determined to have at least a threshold level of similarity to at least a portion of the corresponding elements in the second user profile information, and ii) the at least a portion of the elements in the first user profile information having been added to the first user profile before the at least a portion of the corresponding elements in the second user profile information were added to the second user profile.

19. The computer program product of claim 15, wherein the operations further comprise:
    determining whether the first user profile information includes particular content that i) mentions a user that is purported to be associated with the first user profile or the second user profile in a negative manner, or ii) is of one or more predetermined types of bad content; and
    wherein the determination of whether the first user profile is likely impersonating the second user profile is further based, at least in part, on the determination of whether the first user profile information includes the particular content.

20. The computer program product of claim 19, wherein the one or more predetermined types of bad content are selected from the group consisting of: obscene content, offensive content, pornographic content, and illegal content.

21. The computer program product of claim 15, wherein the elements in the first user profile information are selected from the group consisting of: fields of the first user profile, sensitive fields of the first user profile, photos, identities of other users who are designated as friends, group memberships, a user age or birthdate, social network activity of a user associated with the first user profile, and services associated with the first user profile.

\* \* \* \* \*

UNITED STATES PATENT AND TRADEMARK OFFICE
CERTIFICATE OF CORRECTION

| | | |
|---|---|---|
| PATENT NO. | : 8,484,744 B1 | Page 1 of 1 |
| APPLICATION NO. | : 13/464061 | |
| DATED | : July 9, 2013 | |
| INVENTOR(S) | : Arijit De, Colin M. Bogart and Caitlin S. Collins | |

It is certified that error appears in the above-identified patent and that said Letters Patent is hereby corrected as shown below:

On the Title Page:

Column 1 Item (75), (Inventors), line 1, delete "Dombivili (IN);" and insert
-- Dombivli (IN); --, therefor.

In the Claims:

Column 22, line 28, in Claim 1, after "associated" insert -- with --.

Column 23, line 45, in Claim 8, after "associated" insert -- with --.

Column 24, line 54, in Claim 15, after "associated" insert -- with --.

Signed and Sealed this
Fifteenth Day of October, 2013

Teresa Stanek Rea
*Deputy Director of the United States Patent and Trademark Office*